United States Patent [19]

Robinson

[11] 4,204,551
[45] May 27, 1980

[54] SMOKING PIPE ACCESSORY FOR AUTOMOBILE GEARSHIFT LEVER

[76] Inventor: Roger A. Robinson, 407 SW. 11th, Portland, Oreg. 97205

[21] Appl. No.: 924,372

[22] Filed: Jul. 13, 1978

[51] Int. Cl.$^2$ .............................................. A24F 3/00
[52] U.S. Cl. .................................. 131/178; 131/222; 131/260; 292/350
[58] Field of Search ............... 131/178, 176, 222, 225, 131/179, 226, 260; D27/3; 292/347, 350; 74/473 P, 553, 557; 16/118

[56] References Cited

U.S. PATENT DOCUMENTS

| 738,235 | 9/1903 | Pforntner | D27/32 |
| 1,589,572 | 6/1926 | Seinecke | 131/260 |
| 1,780,029 | 10/1930 | Mickie | 131/176 |
| 2,576,796 | 11/1951 | Lemp | 131/222 |

FOREIGN PATENT DOCUMENTS 2613 of 1892 United Kingdom ..................... 131/176

Primary Examiner—Stephen C. Pellegrino
Attorney, Agent, or Firm—Chernoff & Vilhauer

[57] ABSTRACT

A smoking-pipe, usable as a replacement for a normal gearshift knob in an automobile includes a main body having a cavity, inside which a removable ventilated cartridge used to contain tobacco or other smokable material fits slidingly. A flexible smoke-tube conducts smoke from the base of the cavity to the user's mouth, and a magnetically retained cover conceals the cavity, creating the outward appearance of a custom-made shift control knob. An O-ring and a gasket hold the cartridge in the cavity, prevent noise producing vibration of the cartridge against the walls of the cavity, and provide an air seal around the cartridge to enhance air circulation through the smoking matter.

10 Claims, 7 Drawing Figures

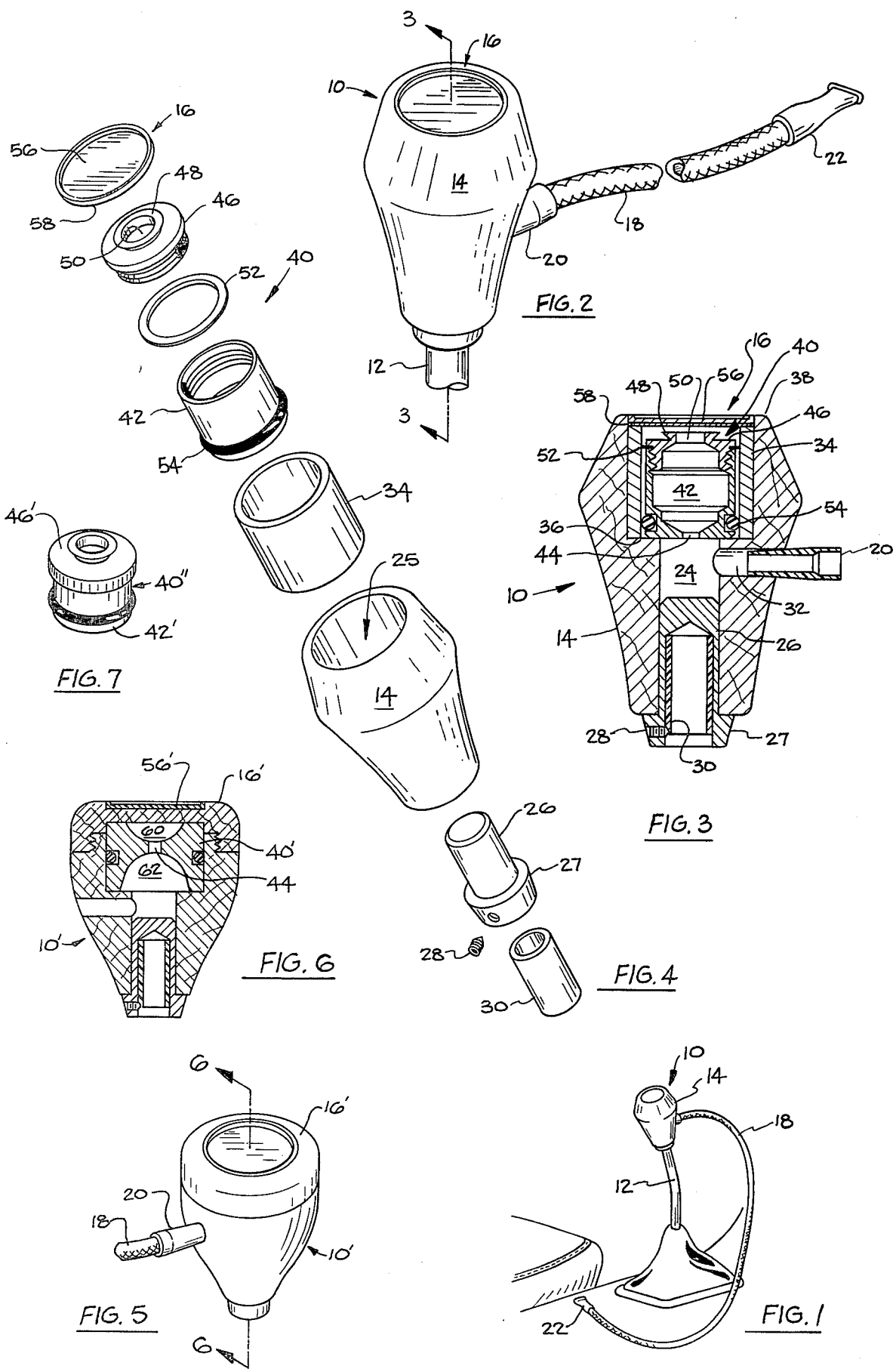

SMOKING PIPE ACCESSORY FOR AUTOMOBILE GEARSHIFT LEVER

BACKGROUND OF THE INVENTION

The present invention relates to improvements in smoking-pipes, and particularly to adaptation of smoking-pipes for convenient, safe use in automobiles.

In the past, little, if any, thought has been given to special adapation of smoking-pipes for use in automobiles. There are numerous disadvantages inherent in smoking cigarettes and ordinary pipes in an automobile, especially for the operator of the vehicle. A primary disadvantage to smoking cigarettes or ordinary pipes is the danger, especially when one is driving alone, of a fire being started either in one's clothing or the upholstery of the seats or floors of the automobile. When occupied by operation of a vehicle, spillage of ashes and burning smoking material may occur unnoticed, resulting in a significant amount of damage to the vehicle before discovery. The sudden realization that burning material has dropped or that something is smoldering within the automobile's upholstery may be quite distracting, resulting in a dangerous diversion of the attention of the operator away from the task of directing the vehicle. This, of course, can, and often does, result in traffic accidents.

Smoking an ordinary pipe at all is difficult for a person driving an automobile alone, since it requires first filling the pipe bowl, packing tobacco in place, and finally lighting the tobacco, all of which operations are much more easily accomplished using two hands than one. Using two hands, however, would require stopping the vehicle.

When the tobacco in an ordinary pipe has been completely smoked, there is also the problem of disposal of the ashes. Merely putting the pipe in one's pocket results in losing ashes into one's clothes. Placing the pipe somewhere such as on the dashboard of the automobile leaves the problem of the pipe falling to the floor, becoming a distracting nuisance, or being damaged. Dumping ashes into the ash tray of the car can be a dangerously distracting task for the driver. Finally, it may be desired to smoke clandestinely in the vehicle, which cannot be accomplished with an ordinary cigarette or pipe, or to have a pipe which is not immediately recognizable as a pipe.

SUMMARY OF THE INVENTION

In the present invention the disadvantages of an ordinary pipe or cigarette are overcome by mounting a smoking-pipe which resembles an ordinary wooden knob for a gearshift lever, on the floor mounted gearshift lever in an automobile in place of the customary solid knob supplied by the automobile manufacturer. In an automobile having other than a floor mounted shift control lever, the same sort of a smoking-pipe may be mounted on a separately provided mounting point in a convenient location.

A cavity formed inside the main body of the pipe of the invention receives a removable cartridge which holds a predetermined amount of tobacco or the like and which includes ventilating holes to allow air to enter and smoke to exit the cartridge. The cartridge may be filled in advance and need merely be placed in the cavity and lighted, using one hand. A smoke vent is located in the lower portion of the main body cavity, and a removable flexible tube there joined to the body leads to a mouthpiece similar to that of an ordinary smoking pipe or cigarette holder. The flexible tube is long enough to be held in the mouth of the driver of the automobile, allowing him to smoke without the worry of spilling burning smoking material or ashes.

In the preferred embodiment of the invention, a sleeve of ferromagnetic material such as iron or mild steel is press fitted into the cavity of the main body of the smoking pipe. The tobacco cartridge fits slidingly within the sleeve, where a resilient O-ring mounted in an annular groove circumscribing the cartridge provides an air seal between the cartridge and the sleeve. A lid is removably connected to the lower, or bowl, portion of the cartridge by mating screw threads, and a gasket, located between the upper rim of the bowl portion of the cartridge and the lid, extends radially a slight distance from the joint between the bowl and the lid. The O-ring and gasket stabilize the cartridge slidingly within the sleeve so that it cannot vibrate within the sleeve and cause noise or work its way out of the cavity when the automobile is being operated.

The cavity is closed by a magnetically retained decorative cover which minimizes obviousness of the smoking pipe's presence.

It is an object of the present invention, therefore, to provide a smoking-pipe which may be safely and easily smoked while operating an automobile without causing distraction of the driver.

It is another object of the invention to provide a smoking-pipe which is disguised as a gearshift control knob.

It is a feature of the smoking-pipe of the invention that it safely contains smoking matter to prevent spillage.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a fragmentary perspective view of an automobile gearshift lever including the smoking-pipe of the invention.

FIG. 2 is a perspective view of a pipe which is a preferred embodiment of the invention.

FIG. 3 is a sectional view of the pipe of FIG. 2 taken on line 3—3.

FIG. 4 is a exploded view of the pipe of FIG. 2.

FIG. 5 is a perspective view of another embodiment of the invention.

FIG. 6 is a sectional view taken on line 6—6 of the pipe of FIG. 5.

FIG. 7 is a perspective view of an alternate form of a tobacco cartridge which is used in the smoking-pipe of the invention.

DETAILED DESCRIPTION OF THE INVENTION

Referring to FIG. 1, a smoking pipe 10 embodying the present invention is seen in perspective view, mounted on an automobile gearshift lever 12. The smoking pipe is seen to comprise a main body 14, to which is connected a smoke tube 18 and a mouthpiece 22.

Referring to FIG. 2, the smoking pipe of the invention in greater detail is seen to comprise a decorative cover 16 on the top of the main body 14, and a smoke vent nipple 20 at the base of the main body 14. The mouthpiece 22 is seen to resemble the mouthpiece of an ordinary cigarette holder or smoking pipe.

Referring to FIGS. 3 and 4, the pipe of FIG. 2 is shown in more detail, where it is seen that the main body 14 defines a lower cylindrical cavity 24 and an interconnected upper cylindrical cavity 25 of larger diameter. A hollow, cylindrical metal socket 26, having an enlarged shoulder portion 27 at its lower end, is tightly fitted within the lower portion of the lower cavity 24, with the shoulder 27 abutted against the base of the main body 14 of the smoking pipe. If desired the hollow, cylindrical socket may be adhesively fixed to the main body. A set screw 28 is fitted in the enlarged shoulder 27 of the socket 26 and extends inwardly toward the interior thereof. An adapter 30, of polyurethane or other tough plastic material, is located within the socket 26, allowing the pipe to be attached to a gearshift lever by being screwed down onto the threaded end of the lever. A choice of adapters of different sizes allows use of the smoking-pipe of the invention on gearshift levers of various sizes.

A smoke vent 32 comprises a cylindrical orifice which extends inwardly from the exterior of the main body and intersects the smaller cylindrical cavity 24 at a point above the upper extremity of the socket 26. An open-ended cylindrical sleeve 34 of ferromagnetic material such as mild steel is located within the larger cylindrical cavity 25, by press-fitting it into contact with the annular bottom surface 36 of the cavity 25, where the sleeve 34 may be adhesively fastened in place. The sleeve does not extend over the entire length of the cavity, but terminates a short distance below the upper edge 38 of the main body 14, its upper edge forming an annular ledge within the upper portion of the cavity, upon which the cover 16 rests with its outer surface flush with the upper edge 38. Thus the main body 14 and the removable cover 16 together present the outward appearance of a normal custom-made gearshift knob.

A cartridge 40, which fits slidingly within the sleeve, is used to contain the tobacco. For ease of manufacture the cartridge presently is made of aluminum or other soft metal, but for utility any material which may be suitably formed and has resistance to heat may be used. The cartridge comprises a bowl portion 42, which is cylindrical in its outward shape and has a cup-shaped interior to hold the tobacco. The bowl defines a small smoke outlet orifice 44 in the bottom surface thereof, as well as a helical interior thread in its upper portion. A cartridge lid 46, which extends horizontally across the top of the bowl, is removably connected to the bowl by a mating thread, and the edge of the lid is knurled to allow easy removal of the lid from the cartridge. An inverted frusto-conical handle 48 is mounted on the upper side of the lid 46, to allow easy removal of the cartridge from within the sleeve 34, and an aperture 50 extends through the handle and the lid to the interior of the cartridge. If desired the aperture can be covered by a removable screen (not shown) to prevent spillage of tobacco. A thin resilient gasket 52 is fitted between the bowl and the lid of the cartridge, and extends radially from the joint a slight distance. A resilient O-ring 54 is fitted in an annular groove about the lower periphery of the bowl of the cartridge. The O-ring 54 and the gasket 52 bear against the inner wall of the sleeve 34 to cooperatively prevent the cartridge from rattling and thus producing undesired noise or from climbing out of the sleeve as a result of vibration of the gearshift lever 12 to which the pipe of the invention is attached.

The cover 16 is comprised of a decorative medallion 56 made, for ease of manufacture, of aluminum embossed in a suitable decorative design, and having a layer of ferrite magnetic material 58, adhesively attached thereto. The cover is retained in place against the upper edge of the sleeve 34, and within the upper rim 38 of the main body 14 of the pipe, by the attraction of the magnetic ferrite to the material of the sleeve 34.

The O-ring 54 creates an air seal between the cartridge and the sleeve to allow the smoker to create a draft through the tobacco or other smoking material by inhalation at the mouthpiece 22 of the smoke tube 18. While the cover 16 is held in place by its magnet securely enough to retain it in place, it is easily and quickly removed. Also, while the pipe normally smoked with the cover removed, leakage around the cover, combined with air which enters the bowl via the smoke tube may be sufficient to maintain combustion.

Referring to FIGS. 5 and 6, another embodiment of the invention is seen, in which a cover 16' is secured to the main body of the smoking-pipe by threads, and a cartridge 40' includes two alternately available bowls 60 and 62 of different sizes. A decorative medallion 56' is set into the cover 16'.

Referring to FIG. 7, an alternative tobacco cartridge 40" is seen, in which the lid 46' has the form of an inverted cup which fits slidingly around the upper portion of the bowl 42' and also within the sleeve 34 when the cartridge 40" is placed therein. The cartridge 40" is similar in its other respects to the cartridge 40 described previously.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A pipe for smoking tobacco and the like, comprising:
   (a) a main body member having a cavity and a lower cavity therein defined;
   (b) attachment means for attaching said main body to an automobile, said attachment means comprising a tubular metal socket arranged to fit tightly within said lower cavity and having a closed upper end, tubular plastic adaptor means for fitting within said socket for engaging a threaded portion of an automobile gearshift control lever, and set screw means located in said socket for securing said adaptor means therein for resisting rotation of said socket about said gearshift control lever;
   (c) removable cartridge means located within said cavity for containing tobacco, said cartridge means having an outlet orifice for allowing smoke to pass from the interior of said cartridge means into said cavity;
   (d) cover means associated with said main body for concealing said cartridge when it is located within said cavity; and
   (e) smoke tube means for transmitting smoke away from said cavity.

2. The pipe of claim 1 wherein said cover means extends circumscribingly downward around said cartridge means and is removably attached to said main body member.

3. The pipe of claim 1 wherein said cover means extends downwardly around said cartridge means.

4. An automobile accessory for smoking tobacco and the like, comprising:
   (a) a main body having a cavity therein defined;
   (b) attachment means for attaching said main body to a gearshift control lever in an automobile;
   (c) a ferromagnetic sleeve located within said cavity so as to form an annular ledge within said cavity, said sleeve having a cylindrical inner wall;
   (d) a removable cartridge having an open top located within said sleeve, said cartridge including orifice means defined in the lower portion thereof opening into said cavity for allowing smoke to exit from said cartridge into said cavity;
   (e) removable cover means having a ferrite magnetic portion which is attracted to said sleeve for communicating within said cavity into abutment with said ledge to retain said cartridge within said cavity and to present the outward appearance of an ordinary gearshift knob; and
   (f) smoke tube means for conducting smoke from said cavity.

5. The accessory of claim 4 wherein said cartridge includes an annular groove defined in a lower portion thereof, a resilient O-ring mounted within said groove, said O-ring protruding slightly beyond the exterior dimension of said cartridge; and wherein said orifice means is defined in the bottom of said cartridge for allowing smoke to exit from said cartridge into said cavity below said O-ring.

6. The accessory of claims 4 or 5 wherein said cartridge includes removable lid means for retaining tobacco therein, said lid means having aperture means therein defined for admission of combustion air and for allowing ignition of the tobacco therein contained.

7. The accessory of claim 6 wherein said lid is an inverted cup and includes a cylindrical skirt which fits slidingly around said bowl portion of said cartridge and within said sleeve.

8. The accessory of claim 6 wherein a resilient gasket is located between said removable lid and said cartridge bowl, said gasket extending radially beyond said cartridge into slidingly movable contact with the inner wall of said sleeve.

9. The accessory of claim 6 wherein said lid includes an inverted frusto-conical handle means for removing said cartridge from within said cavity.

10. The accessory of claim 4 wherein said cartridge includes two bowls of different sizes, said bowls being joined in base-to-base coaxial orientation and having an orifice interconnecting the bottoms thereof.

* * * * *